United States Patent [19]

Spain

[11] 3,771,253

[45] Nov. 13, 1973

[54] PROCESS FOR EXTERMINATING RODENTS

[76] Inventor: Levern Spain, 91 B Hazelhursh Dr., Rochester, N.Y.

[22] Filed: Feb. 25, 1971

[21] Appl. No.: 115,830

[52] U.S. Cl. .................................................. 43/124
[51] Int. Cl. ........................................... A01m 25/00
[58] Field of Search .............................. 43/124, 131

[56] References Cited
UNITED STATES PATENTS

| | | | |
|---|---|---|---|
| 768,620 | 8/1904 | Parker | 43/124 |
| 1,309,606 | 7/1919 | Bartholomew | 43/131 |
| 3,324,590 | 6/1967 | Richardson | 43/131 |

FOREIGN PATENTS OR APPLICATIONS

| | | | |
|---|---|---|---|
| 436,034 | 10/1926 | Germany | 43/1 |

*Primary Examiner*—Warner H. Camp
*Attorney*—Fred L. Denson

[57] ABSTRACT

Effective extermination of rodents in infested areas of urban communities is accomplished by contaminating a captured rodent with a skin poison, freeing the contaminated rodent in a target area and contacting the contaminated rodent with another rodent causing the second rodent to become contaminated with a lethal amount of skin poison.

10 Claims, No Drawings

PROCESS FOR EXTERMINATING RODENTS

This invention relates to a novel process for exterminating rodents from infested areas in urban communities.

In most urban areas throughout the nation, there are continuing programs and campaigns aimed at substantially reducing or eliminating the rodent population. Rats are undesirable in all communities, particularly since they serve no useful purpose to mankind. In fact, they are generally deemed to be detrimental to the existence of human beings. Bites, food and crop destruction and serving as disease carriers are only a few of the many undesirable characteristics of rats.

Over $500,000,000 in food supply and property are destroyed annually by rats. Numerous rat bites to infants have been reported and many more have gone unreported by parents who feel that such incidents were merely isolated cases or freak occurrences.

Most large municipalities have set up rodent control programs to help combat rat infestation. These programs conventionally consist of the following components:

A. Legislation prohibiting a property owner from allowing his property to be in a state which encourages the breeding of rats; e.g. holes leading into dwellings, lack of garbage containers and lids, excessive litter and trash on premises, etc.

B. Educational programs usually in the form of literature hand-outs to inform residents of "self-help" procedures for combating rats.

C. Preventive programs which generally make available at little or no cost basic equipment (such as garbage cans and lids) to help eliminate rats.

D. Biological warefare wherein technicians are made available to spread rat poisons.

E. Research aimed at finding new techniques to combat rats.

The techniques utilized by most municipal agencies appear to have met limited success in reducing the rat population. This success has been limited most probably because conventional techniques having limited effectiveness have been utilized. Not only are these conventional techniques of limited effectiveness, but they also have certain drawbacks. For example, in the case of poisonous baiting, it is practically impossible to limit the intake of poison to rats and not to other animals (including human beings). Even though there have been improvements as a result of these endeavors, a large rat problem is still in existence.

From an economic viewpoint, the cost of implementing a program based on conventional techniques of poisoning, hole blocking, etc. is relatively high as measured in terms of dollars spent to eliminate one rat site. Also, with regard to efficiency, conventional techniques leave much to be desired since poisons must be placed at or near rat sites. It is very difficult to place bait at all rat sites simply because the location of such sites are inaccessible or not known.

It is an object of this invention to provide a novel process for substantially reducing the rodent population of urban communities.

It is another object of this invention to provide a novel process for exterminating rodents in urban communities.

It is a further object of this invention to provide a novel process for exterminating rodents which is more efficient than conventional techniques.

Another object of this invention is to provide a novel process for exterminating rodents which is more economical than conventional techniques.

Still another object of the invention is to provide a novel process for exterminating rodents which is safer than conventional techniques.

These and other objects are accomplished by contaminating a captured rodent or set of rodents with a skin poison. The captured rodent is then freed in the target area of infestation where it contacts other rodents. A lethal amount of the poison is transferred during contact causing death to the second rodent.

While the techniques of this invention are applicable for the extermination of all rodents including moles, rats, mice, hamsters, rabbits, etc. the preferred species is the common rat.

In the practice of this invention, the treated rats either sexually or casually contact other rats who in turn become contaminated. Depending on the toxicity of the poison used, the contaminated rats generally die within several hours or a few days at the most after initial contact. In many cases, it is desireable to render the treated or carrier rat immune to the skin poison. This is generally accomplished by treating the carrier with an antidote or other substance which retards the effect of the poison. Such treatment enables the carrier to have a prolonged life during which time it can contact and contaminate several other rats.

The skin poison can be applied to the carrier in any of several known manners, e.g., by spraying, dipping, spot dropping, etc. The preferred method, however, involves implanting a container containing the poison in the ventral side of the carrier in close proximity to the genital opening. The container is implanted such that one end of it remains exposed above the surface of the skin. The pressure caused by sexual contact causes the exposed end of the container to rupture causing a lethal amount of the skin poison to be deposited on the skin of the contacted rat. Alternatively, a small opening can be made by clipping the exposed portion of the container. The container can be made of any pliable substance such as a plastic.

Any of several known skin poisons can be used. Such poisons include Antu, Atropine, Camphor, Carbon Tetrachloride, Chlorpromazine, D-D (Dichloroplopene-Dichlorophopane), Dinitrophenol, Lye, Hydrocyanic Acid, Methyl Alcohol, Nicotine, Oxalate, Warfarin, Parathion, Reserpine, Rotenone. In order to increase the probability of contact, it is frequently desireable to treat the carrier rat with a substance which causes compulsive sexual activity. Several such substances are known in the art, a typical one being, P-Chlorophenylalanine.

The advantages of this invention are numerous. It enables rat poisons to be disseminated in areas which were completely inaccessible by conventional techniques. Also, a greater number of rats are killed per dollar spent than by conventional techniques, i.e., the method described herein is more economical than known techniques.

The following examples are included for a further understanding of the invention.

EXAMPLE I

Several sets of experiments were conducted utilizing this new technique. In a typical set of experiments, small sealed plastic bags containing 15 mls of an aqueous solution of hydrocyanic acid are implanted on the ventral side of each of seven male rats in close proximity to the genital opening. The implantations are carried out in a manner such that a small portion of one end of the bag remains exposed. After the wound is completely healed, the exposed end of the bag is clipped.

The seven treated male rats are placed in a cage with four untreated female rats and three untreated male rats. After 4 hours, all 14 rats were alive. After 8 hours, four treated male rats, four untreated female rats and one untreated male rat were dead. Within 16 hours all rats had died. The four untreated female rats were contaminated with the poison during sexual contact with the treated male rats. The three untreated male rats were contaminated with the poison by:

A. Sexual contact with the four untreated female rats after each of the untreated female rats had sexual contact with the treated male rats and by;

B. Causual contact with the seven treated male rats.

TABLE I

| Rat Description | | NO. | DEATHS | | |
|---|---|---|---|---|---|
| Sex | Treatment | | After 4 hr. | After 8 hr. | After 16 hr. |
| male | treated | 7 | 0 | 4 | 7 |
| female | untreated | 4 | 0 | 4 | 4 |
| male | untreated | 3 | 0 | 1 | 3 |

EXAMPLE II

In another set of experiments, small sealed plastic bags containing 15 mls of an aqueous solution of hydrocyanic acid are implanted in the ventral side of each of seven female rats in close proximity to the genital opening.

The seven treated female rats are placed in a cage with four untreated male rats and three untreated female rats. After 4 hours, all 14 rats were alive. After 8 hours, five treated female rats, three untreated male rats and two untreated female rats were dead. Within 16 hours, all rats had died. The four untreated male rats were contaminated with the poison during sexual contact with the treated female rats. The three untreated female rats were contaminated with the poison by:

A. Sexual contact with the four untreated male rats after each of the untreated male rats had sexual contact with the treated female rats and by;

B. Casual contact with seven treated female rats.

TABLE II

| Rat Description | | NO. | DEATHS | | |
|---|---|---|---|---|---|
| Sex | Treatment | | After 4 hr. | After 8 hr. | After 16 hr. |
| female | treated | 7 | 0 | 5 | 7 |
| male | untreated | 4 | 0 | 3 | 4 |
| untreated | | 3 | 0 | 2 | 3 |

The invention has been described in detail with particular reference to preferred embodiments thereof, but it will be understood that variations and modifications can be effected within the spirit and scope of the invention.

I claim:

1. A process for exterminating rodents in infested areas of urban communities comprising contaminating a first set of rodents with a lethal amount of a skin poison and depositing a lethal amount of said skin poison on the surface of the skin of a second set of rodents by contacting said second set with the contaminated areas of said first set of rodents.

2. A process for exterminating rats in infested areas of urban communities comprising;

A. Implanting containers on the ventral side of a first set of rats in a manner such that a portion of the containers protrudes through the skin, said containers having a lethal amount of a skin poison, and, B. Contacting the ventral side of the first set of rats with a second set of rats, causing a lethal amount of the poison to flow from said containers and be deposited on the skin of said second set of rats.

3. The process of claim 2, wherein said poison is hydrocyanic acid.

4. The process of claim 2, wherein the contacting step is accomplished during sexual intercourse.

5. The process of claim 2, wherein the first set of rats is treated with a material which causes compulsive sexual activity.

6. The process of claim 2, wherein the second set of rats contacts and contaminates a third set of rats after said second set has contacted said first set of rats.

7. A process for exterminating rats in infested areas of urban communities comprising;

A. Implanting a container on the ventral side of a male rat in a manner such that a portion of said container remains exposed, said container having a lethal amount of a skin poison, and, B. Contacting, through sexual intercourse, the ventral side of said male rat with a female rat causing a lethal amount of the poison to flow from said container and be deposited on the skin of the female rat.

8. The process of claim 7, wherein the skin poison is hydro-cyanic acid.

9. The process of claim 7, wherein the container comprises a plastic bag.

10. The process of claim 7, wherein the pressure resulting from contacting the male rat and the female rat is sufficient to rupture the exposed portion of said container.

* * * * *